(12) United States Patent
Kawase et al.

(10) Patent No.: US 7,838,147 B2
(45) Date of Patent: Nov. 23, 2010

(54) ELECTRODE AND BATTERY USING IT

(75) Inventors: Kenichi Kawase, Kanagawa (JP);
Tomoo Takada, Kanagawa (JP); Yukio Miyaki, Kanagawa (JP)

(73) Assignee: Sony Corporation, Tokyo (JP)

( * ) Notice: Subject to any disclaimer, the term of this patent is extended or adjusted under 35 U.S.C. 154(b) by 929 days.

(21) Appl. No.: 10/813,370

(22) Filed: Mar. 30, 2004

(65) Prior Publication Data
US 2004/0234861 A1 Nov. 25, 2004

(30) Foreign Application Priority Data
Apr. 4, 2003 (JP) ............... P2003-101189

(51) Int. Cl.
*H01M 10/16* (2006.01)
(52) U.S. Cl. .......... 429/218.1; 429/208; 429/209
(58) Field of Classification Search .......... None
See application file for complete search history.

(56) References Cited

U.S. PATENT DOCUMENTS

| 2002/0031708 | A1 | 3/2002 | Krause et al. | |
| 2002/0168572 | A1 | 11/2002 | Tamura et al. | |
| 2003/0054253 | A1* | 3/2003 | Morishima et al. | 429/231.95 |

FOREIGN PATENT DOCUMENTS

| EP | 1 052 711 A1 | 11/2000 |
| EP | 1 244 164 A1 | 9/2002 |
| JP | 08-050922 | 2/1996 |
| JP | 2002-231224 | 8/2002 |
| JP | 2002 260637 | 9/2002 |
| JP | 2002-289178 | 10/2002 |
| WO | WO 03/023879 A2 | 9/2002 |

OTHER PUBLICATIONS

Japanese Office Action issued on Nov. 30, 2007 in connection with Japanese Patent Application No. JP 2003-101189.
Japanese Office Action issued on Apr. 8, 2008.

* cited by examiner

*Primary Examiner*—Patrick Ryan
*Assistant Examiner*—Cynthia Lee
(74) *Attorney, Agent, or Firm*—SNR Denton US LLLP (57) ABSTRACT

The invention provides an electrode which can improve cycle characteristics by reducing structural destruction of an active material layer and reaction between the active material layer and an electrolyte according to charge and discharge, and a battery using it. A current collector made of a metal material containing a metal element which does not form an intermetallic compound with Li, such as Cu, Ni, Ti, Fe, and Cr; the active material layer containing Si, Ge, or an alloy thereof, and a thin film layer made of a metal material containing at least one of metal elements and metalloid elements which can make a solid solution with lithium and do not form an intermetallic compound with lithium, e.g. Cu, Ni are layered in this order. The current collector is alloyed with the active material layer, and the thin film layer is alloyed with the active material layer.

27 Claims, 4 Drawing Sheets

ELECTRODE AND BATTERY USING IT

RELATED APPLICATION DATA

The present application claims priority to Japanese Application(s) No(s). P2003-101189 filed Apr. 4, 2003, which application(s) is/are incorporated herein by reference to the extent permitted by law.

BACKGROUND OF THE INVENTION

1. Field of the Invention

The present invention relates to an electrode comprising a current collector and an active material layer, and a battery using it.

2. Description of the Related Art

In recent years, mobile devices have become sophisticated and multifunctional. Along with these situations, a high capacity secondary battery has been desired as a power source for these mobile devices. As a secondary battery corresponding to such a desire, there is a lithium ion secondary battery. However, in the case using a typical lithium secondary battery, wherein cobalt acid lithium is used for a cathode and graphite is used for an anode, the battery capacity is in a saturation state, and a significantly high capacity is hard to be realized. Therefore, from long time ago, it has been considered to use metal lithium (Li) for the anode. However, in order to put this anode into practical use, it is necessary to improve precipitation-dissolution efficiency of lithium, and control dendrite precipitation feature.

Meanwhile, recently, a high capacity anode, wherein silicon (Si), germanium (Ge), tin (Sn) or the like is used is actively considered. However, when charge and discharge is repeated, this anode is crushed to fine particles due to intense expansion and shrinkage of the anode active material. In result, its current collecting characteristics deteriorate, decomposition reaction of the electrolytic solution is promoted due to increase in the surface area, and its cycle characteristics are very poor. Therefore, an anode, wherein an active material layer is formed on an current collector by vapor-phase deposition method, liquid-phase deposition method, sintering method or the like has been considered (for example, refer to Japanese Unexamined Patent Application Publication No. H8-50922, Japanese Patent No. 2948205, and Japanese Unexamined Patent Application Publication No. H11-135115). According to this anode, compared to the conventional coating-type anode, wherein a slurry containing a particle active material and a binder is coated, to become fine particles can be inhibited, and the current collector and the active material layer can be integrated. Therefore, electronic conductivity in the anode becomes very excellent, and it is expected that its capacity and its cycle life would be sophisticated. Further, in this case, it is possible to reduce or exclude a conductive material, a binder, voids or the like, which have been existed in the conventional anode. Consequently, the anode can become a thin film essentially.

However, also in this anode, the active material falls off due to expansion and shrinkage of the active material according to charge and discharge, and its cycle characteristics are not sufficient. Further, reactivity with the electrolyte is still high. Therefore, lowering of the battery capacity is induced by reaction with the electrolyte according to charge and discharge.

SUMMARY OF THE INVENTION

The invention has been achieved in consideration of such problems, and it is an object of the invention to provide an electrode which can improve cycle characteristics by reducing structural destruction of an active material layer and its reactivity with an electrolyte according to charge and discharge, and a battery using it.

A first electrode according to the invention comprises a current collector containing at least one from the group consisting of copper (Cu), nickel (Ni), titanium (Ti), iron (Fe), and chromium (Cr); an active material layer containing at least one from the group consisting of simple substances and compounds of silicon or germanium provided on the current collector; and a thin film layer containing at least one of copper and nickel provided on the active material layer.

A second electrode according to the invention comprises a current collector containing a metal element which does not form an intermetallic compound with lithium; an active material layer containing at least one from the group consisting of simple substances and compounds of silicon or germanium provided on the current collector; and a thin film layer containing at least one of metal elements and metalloid elements which can make a solid solution with lithium and do not form an intermetallic compound with lithium provided on the active material layer.

A first battery according to the invention comprises a cathode, an anode, and an electrolyte, wherein the anode comprises a current collector containing at least one from the group consisting of copper, nickel, titanium, iron, and chromium; an active material layer containing at least one from the group consisting of simple substances and compounds of silicon or germanium provided on the current collector; and a thin film layer containing at least one of copper and nickel provided on the active material layer.

A second battery according to the invention comprises a cathode, an anode, and an electrolyte, wherein the anode comprises a current collector containing a metal element which does not form an intermetallic compound with lithium; an active material layer containing at least one from the group consisting of simple substances and compounds of silicon or germanium provided on the current collector; and a thin film layer containing at least one of metal elements and metalloid elements which can make a solid solution with lithium and do not form an intermetallic compound with lithium provided on the active material layer.

In the first electrode and the second electrode according to the invention, structural destruction of the current collector according to formation of an intermetallic compound with lithium is prevented, and fall-off of the active material from the current collector according to expansion and shrinkage of the active material is inhibited. Further, reaction between the active material layer and the electrolyte is inhibited by the thin film layer, and structural destruction of the active material layer according to its expansion and shrinkage is inhibited.

In the first battery and the second battery according to the invention, the electrodes of the invention are used. Therefore, cycle characteristics are improved.

Other and further objects, features and advantages of the invention will appear more fully from the following description.

DETAILED DESCRIPTION OF THE PREFERRED EMBODIMENT

An embodiment of the invention will be described in detail hereinbelow with reference to the drawings.

Figure 1:
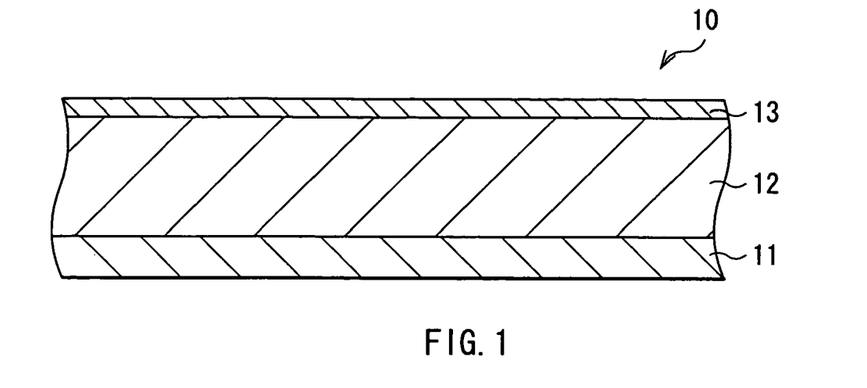
FIG. 1 is a cross sectional view, simply showing a construction of an electrode according to an embodiment of the invention.

FIG. 1 simply shows a construction of an electrode according to the embodiment of the invention. An electrode 10 comprises, for example, a current collector 11, an active material layer 12 provided on the current collector 11, and a thin film layer 13 provided on the active material layer 12. The current collector 11, the active material layer 12, and the thin film layer 13 are layered in this order. The active material layer 12 and the thin film layer 13 can be formed either on both sides or on single side of the current collector 11.

The current collector 11 is preferably made of a metal material containing at least one of metal elements which do not form an intermetallic compound with lithium. When the current collector 11 forms an intermetallic compound with lithium, the current collector 11 expands and shrinks according to charge and discharge, its structural destruction arises, and its current collecting characteristics become lowered. In addition, its capability to support the active material layer 12 becomes lowered, so that the active material layer 12 easily falls off from the current collector 11. In this specification, examples of the metal material not only include simple substances of the metal elements, but also include alloys comprised of two or more metal elements, or one or more metal elements and one or more metalloid elements. Examples of the metal element which does not form an intermetallic compound with lithium include copper, nickel, titanium, iron, and chromium.

Specially, metal elements which are alloyed with the active material layer 12 are preferable. As described later, the active material layer 12 contains at least one from the group consisting of simple substances and compounds of silicon or germanium which is alloyed with lithium. Therefore, the active material layer 12 considerably expands and shrinks according to charge and discharge. However, by tightly adhering the active material layer 12 to the current collector 11 by alloying, it is possible to inhibit fall-off of the active material layer 12 from the current collector 11. As a metal element which does not form an intermetallic compound with lithium, and is alloyed with the active material layer 12, more specifically, as a metal element which is alloyed with at least one from the group consisting of simple substances and compounds of silicon or germanium, copper, nickel, or iron can be cited. In particular, in view of alloying with the active material layer 12, strength, and conductivity, copper, nickel, or iron is preferable.

The current collector 11 can be composed either of a monolayer, or of several layers. In the case using several layers, it is possible that a layer contacting the active material layer 12 is made of a metal material which is alloyed with at least one from the group consisting of simple substances and compounds of silicon or germanium, and other layers are made of other metal materials. It is preferable that the current collector 11 is made of a metal material consisted of at least one of metal elements which do not form an intermetallic compound with lithium, except on the interface with the active material layer 12.

The active material layer 12 contains, for example, at least one from the group consisting of simple substances and compounds of silicon or germanium as an active material. The simple substances and compounds of silicon or germanium can form an alloy with lithium or the like, have high capability of inserting and extracting lithium, and are capable of raising an energy density of the electrode 10 depending on applied combinations, compared to conventional graphite. Examples of the silicon compounds include $SiB_4$, $SiB_6$, $Mg_2Si$, $Ni_2Si$, $TiSi_2$, $MoSi_2$, $CoSi_2$, $NiSi_2$, $CaSi_2$, $CrSi_2$, $Cu_5Si$, $FeSi_2$, $MnSi_2$, $NbSi_2$, $TaSi_2$, $VSi_2$, $WSi_2$, $ZnSi_2$, $SiC$, $Si_3N_4$, $Si_2N_2O$, $SiO_v(0<v\leq 2)$, and LiSiO. Examples of the germanium compounds include $Ge_3N_4$, $GeO$, $GeO_2$, $GeS$, $GeS_2$, $GeF_4$, and $GeBr_4$.

As an active material, a simple substance or compounds of silicon are particularly preferable. The simple substance and the compounds of silicon have low toxicity, and inexpensive.

This active material layer 12 is preferably formed by at least one method from the group consisting of vapor-phase deposition method, liquid-phase deposition method, and sintering method. By using such methods, it is possible to inhibit destruction of the active material 12 due to its expansion and shrinkage according to charge and discharge. Further, the current collector 11 and the active material layer 12 can be integrated, and electronic conductivity in the active material layer 12 can be improved. Furthermore, it is possible to reduce or exclude a binder, a void and the like, and make the electrode 10 a thin film. In this specification, the words, "to form the active material layer by sintering method" means to form a denser layer having a higher volume density compared to the volume density before heat treatment by applying heat treatment under non-oxidizing atmosphere to a layer formed by mixing powders containing an active material and a binder.

The active material layer 12 can be formed by coating, more specifically, can contain an active material and a binder such as polyvinylidene fluoride as necessary. However, the active material layer 12 is preferably formed by at least one method of from the group consisting of vapor-phase deposition method, liquid-phase deposition method, and sintering method. By using such active material layer 12, in addition to the foregoing benefits, the thin film layer 13 can be formed easily compared to the case using the active material layer 12 formed by coating only.

It is preferable that the active material layer 12 is alloyed with the current collector 11 at least on part of the interface between the active material layer 12 and the current collector 11, so that the active material layer 12 does not fall off from the current collector 11 due to expansion and shrinkage. Specifically, it is preferable that on the interface between the active material layer 12 and the current collector 11, component elements of the current collector 11 are diffused in the active material layer 12, or component elements of the active material are diffused in the current collector 11, or both of them are diffused each other. This alloying often arises simultaneously with formation of the active material layer 12 by vapor-phase deposition method, liquid-phase deposition method, or sintering method. It is also possible that this alloying arises when heat treatment is further provided. In this specification, the foregoing diffusion of elements is also included in alloying forms.

The thin film layer 13 is intended to inhibit reaction between the active material layer 12 and an electrolyte, and inhibit structural destruction of the active material layer 12 according to charge and discharge by covering the active material layer 12. The thin film layer 13 is preferably made of a metal material containing at least one of metal elements and metalloid elements which can make a solid solution with lithium and do not make an intermetallic compound, or substances of the metalloid elements. When the thin film layer 13 forms an intermetallic compound with lithium, the thin film layer 13 expands and shrinks according to charge and discharge, falls off from the active material layer 12. In result, the thin film layer 13 becomes incapable of sufficiently inhibiting reaction between the active material layer 12 and the electrolyte, and structural destruction of the active material layer 12. Part of the thin film layer 13 may be oxidized.

Examples of the metal element which can make a solid solution with lithium and does not form an intermetallic compound include copper and nickel.

Specially, the thin film layer 13 is preferably made of a metal element which can be alloyed with at least one from the group consisting of simple substances and compounds of silicon or germanium. The thin film layer 13 is preferably alloyed with the active material layer 12 at least on part of the interface between the thin film layer 13 and the active material layer 12. Specifically, it is preferable that, on the interface between the thin film layer 13 and the active material layer 12, the active material is diffused in the thin film layer 13, or component elements of the thin film layer 13 are diffused in the active material layer 12, or both of them diffuse each other. By tightly adhering the thin film layer 13 to the active material layer 12 by alloying, it is possible to inhibit fall-off of the thin film layer 13 from the active material layer 12.

This thin film layer 13 is preferably formed by at least one method of from the group consisting of vapor-phase deposition method, liquid-phase deposition method, and sintering method, for example. By using such methods, adhesion properties to the active material layer 12 can be improved, and the thin film layer 13 can be uniformly formed on the active material layer 12. Further, by using such methods, alloying between the thin film layer 13 and the active material layer 12 often arises. It is possible that this alloying arises when heat treatment is further provided.

The thickness of the thin film layer 13 is preferably from 50 nm to 1,000 nm. When it is too thin, it is impossible to sufficiently inhibit reaction between the active material layer 12 and the electrolyte, and structural destruction of the active material layer 12 according to charge and discharge. Meanwhile, when it is too thick, raised resistance may considerably lower load characteristics of the whole battery. The thickness of the thin film layer 13 is the thickness not including an alloyed part in the case when the thin film layer 13 is alloyed with the active material layer 12.

Such thin film layer 13 can be composed either of a monolayer, or of several layers. In the case using several layers, it is possible that a layer contacting the active material layer 12 is made of a metal material containing at least one of metal elements and metalloid elements which are alloyed with at least one from the group consisting of simple substances and compounds of silicon or germanium, or simple substances of the metalloid elements, and other layers are made of other metal materials. Further, it is possible that the thin film layer 13 is provided at least on part of the surface of the active material layer 12, and it is not necessary to provide the film layer 13 on the whole surface of the active material layer 12. For example, the thin film layer 13 can be provided in the shape of islands. The thin film layer 13 can comprise openings to expose the active material layer 12.

This electrode 10 can be manufactured as follows, for example.

First, for example, the current collector 11 made of a metal foil is prepared. On the current collector 11, the active material layer 12 is formed by depositing at least one from the group consisting of simple substances and compounds of silicon or germanium as an active material by vapor-phase deposition method or liquid-phase deposition method. Instead, it is possible that the active material layer 12 is formed by sintering method, wherein a precursor layer containing a particle active material is formed on the current collector 11, and then the resultant is sintered. It is also possible that the active material layer 12 is formed by combining two or three methods of vapor-phase deposition method, liquid-phase deposition method, and sintering method. By forming the active material layer 12 by using at least one method of from the group consisting of vapor-phase deposition method, liquid-phase deposition method, and sintering method, the active material layer 12 which is alloyed with the current collector 11 at least on part of the interface with the current collector 11 is formed in some cases. It is possible to further provide heat treatment under vacuum atmosphere or non-oxidizing atmosphere, in order to further alloy the interface between the current collector 11 and the active material layer 12. As necessary, providing this heat treatment is preferable, particularly when the active material layer 12 is formed by plating as mentioned below. The reasons are as follows. That is, the active material layer 12 is hard to be alloyed with the current collector 11 even on the interface thereof in some cases. In addition, as necessary, providing this heat treatment is preferable, in the case of forming the active material layer 12 by vapor-phase deposition method as well, since characteristics can be improved by further alloying the interface between the current collector 11 and the active material layer 12.

The active material layer 12 can be formed by coating as well. Specifically, for example, the active material layer 12 can be formed by preparing a mixture by mixing at least one from the group consisting of simple substances and compounds of silicon or germanium as an active material and a binder, dispersing this mixture in a carrier fluid such as N-methyl pyrrolidone to prepare a mixture slurry, applying this mixture slurry to the current collector 11, drying and compression-molding the resultant. However, it is more preferable that the active material layer 12 is formed by at least one method of from the group consisting of vapor-phase deposition method, liquid-phase deposition method, and sintering method. The reasons are as follows. That is, adhesive properties between the current collector 11 and the active material layer 12 can be improved. In addition, as mentioned before, in such a case, alloying between the current collector 11 and the active material layer 12 often proceeds simultaneously with formation of the active material layer 12.

After forming the active material layer 12, for example, as in the active material layer 12, the thin film layer 13 is formed on the active material layer 12 by at least one method of from the group consisting of vapor-phase deposition method, liquid-phase deposition method, and sintering method. The film layer 13 is thereby uniformly formed on the active material layer 12. In some cases, the thin film layer 13 which is alloyed with the active material layer 12 at least on part of the interface with the active material layer 12 is formed.

As vapor-phase deposition method used in forming the active material layer 12 and the thin film layer 13, for example, physical deposition method or chemical deposition method can be cited. Concrete examples thereof include vacuum deposition method, spattering method, ion plating method, laser abrasion method, thermal CVD (chemical vapor deposition) method, and plasma CVD method. As liquid-phase deposition method, known methods such as electrolytic plating and non-electrolytic plating can be utilized. Regarding sintering method, known methods can be also utilized. For example, atmosphere sintering method, reaction sintering method, and hot press sintering method are available.

Figure 2:
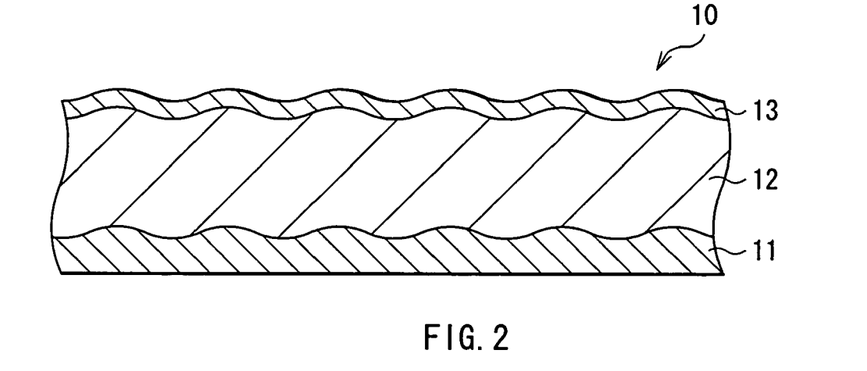
FIG. 2 is a cross sectional view, showing a construction of an electrode, wherein an active material layer is formed by vapor-phase deposition method, liquid-phase deposition method, or coating.
Figure 3:
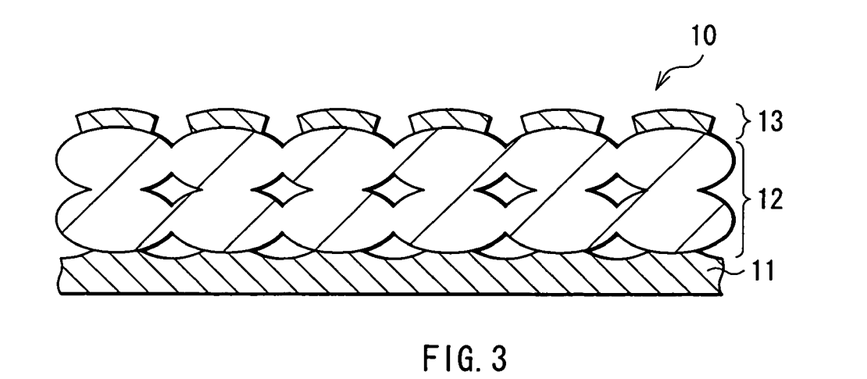
FIG. 3 is a cross sectional view, showing a construction of an electrode, wherein an active material layer is formed by sintering method.

After performing the foregoing processes, for example, the electrode 10 as shown in FIG. 2 or FIG. 3 is completed. FIG. 2 shows an example when the active material layer 12 is formed by vapor-phase deposition method, liquid-phase deposition method, or coating. FIG. 3 shows an example when the active material layer 12 is formed by sintering method. When the active material layer 12 is formed by vapor-phase deposition method, liquid-phase deposition method, or coating, as shown in FIG. 2, the active material layer 12 is often formed on the whole surface of the current collector 11. Therefore, the thin film layer 13 formed thereon is also often formed on the whole surface of the active material layer 12. Meanwhile, when the active material layer 12 is formed by sintering method, as shown in FIG. 3, there are often remained gaps between applied active materials as voids in the active material layer 12. Therefore, the thin film layer 13 is often formed on part of the active material layer 12.

This electrode 10 is used for an anode of the secondary battery as below, for example.

Figure 4:
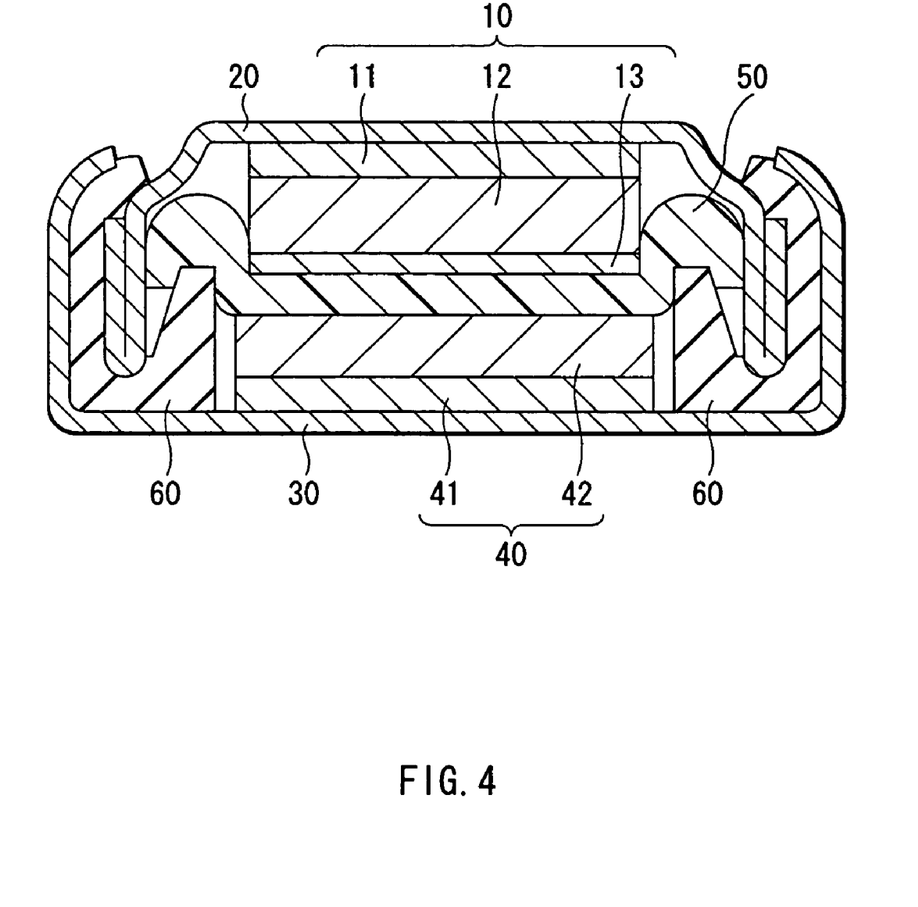
FIG. 4 is a cross sectional view, showing a construction of a secondary battery, wherein the electrode shown in FIG. 1 is used.

FIG. 4 shows a construction of the secondary battery. This secondary battery is a so-called coin type battery. The electrode 10 as the anode housed in an exterior cup 20 and an electrode 40 as the cathode housed in an exterior can 30 are layered with a separator 50 in between. Peripheral parts of the exterior cup 20 and the exterior can 30 are hermetically closed through caulking by insulating gasket 60. The exterior cup 20 and the exterior can 30 are made of metals such as stainless and aluminum, respectively.

The electrode 40 comprises, for example, a current collector 41, an active material layer 42 provided on the current collector 41. The electrode 40 is arranged so that the active material layer 42 side is facing the thin film layer 13. The current collector 41 is made of, for example, aluminum, nickel, stainless or the like.

The active material layer 42 contains one or more cathode materials capable of inserting and extracting lithium as an active material. The active material layer 42 can contain a conductive material such as a carbon material, and a binder such as polyvinylidene fluoride as necessary. As a cathode material capable of inserting and extracting lithium, for example, lithium-containing metal complex oxides expressed by a general formula of $Li_xMIO_2$ are preferable. The lithium-containing metal complex oxides can generate a high voltage and have a high density, so that further high capacity of the secondary battery can be obtained by using them. MI represents one or more transition metals, and is preferably at least one of cobalt and nickel, for example. x varies depending on charge and discharge state of the battery, and is generally a value in the range of $0.05 \leq x \leq 1.10$. Concrete examples of such lithium-containing metal complex oxides include $LiCoO_2$ and $LiNiO_2$.

The electrode 40 can be formed by, for example, preparing a mixture by mixing an active material, a conductive material and a binder, dispersing this mixture in a carrier fluid such as N-methyl pyrrolidone to prepare a mixture slurry, applying this mixture slurry on the current collector 41 made of a metal foil and the like, and drying and compression-molding the resultant to form the active material layer 42.

The separator 50 is intended to separate the electrode 10 from the electrode 40, prevent a current short circuit due to contact between both the electrodes, and let through lithium ions. This separator 50 is made of, for example, polyethylene or polypropylene.

An electrolytic solution of a liquid electrolyte is impregnated in the separator 50. This electrolytic solution contains, for example, a solvent and a lithium salt as an electrolyte salt dissolved in this solvent, and can contain an additive as necessary. Examples of the solvent include organic solvents such as ethylene carbonate, propylene carbonate, dimethyl carbonate, diethyl carbonate, and ethyl methyl carbonate. Either one of them or a mixture of two or more of them can be used.

Examples of the lithium salt include $LiPF_6$, $LiCF_3$, $SO_3$, and $LiClO_4$. Either one of them or a mixture of two or more of them can be used.

This secondary battery can be manufactured, for example, by layering the electrode 10, the separator 50, wherein an electrolytic solution is impregnated, and the electrode 40, housing the layered body in the exterior cup 20 and the exterior can 30, and performing caulking.

In this secondary battery, when charged, lithium ions are extracted from the electrode 40, and are inserted in the electrode 10 through the electrolytic solution. When discharged, for example, lithium ions are extracted from the electrode 10, and are inserted in the electrode 40 through the electrolytic solution. Along with this charge and discharge, the active material layer 12 expands and shrinks. However, since the current collector 11 contains a metal element which does not form an intermetallic compound with lithium, structural destruction of the current collector 11 itself is inhibited, and fall-off of the active material layer 12 from the current collector 11 is inhibited. The thin film layer 13 inhibits reaction between the active material layer 12 and the electrolytic solution, and inhibits structural destruction of the active material layer 12 according to its expansion and shrinkage. It is thought that lithium ions move between the electrolytic solution and the active material layer 12 via cracks or pin holes of the thin film layer 13, or by diffusing themselves in the thin film layer 13 in the case where the thin film layer 13 is thin.

The electrode 10 according to the embodiment can also be used for an anode of the secondary battery as below.

Figure 5:
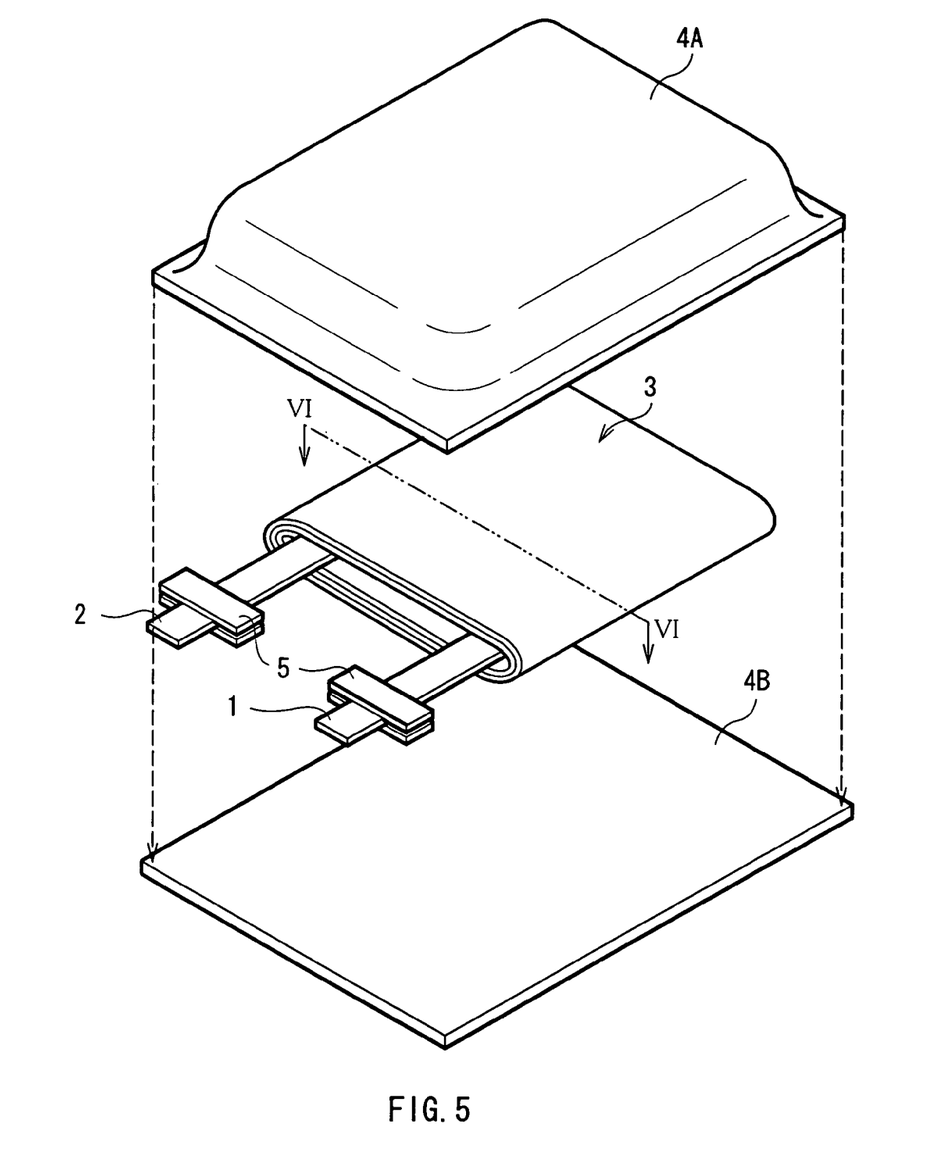
FIG. 5 is an exploded perspective view, showing a construction of other secondary battery, wherein the electrode shown in FIG. 1 is used.

FIG. 5 shows a construction of the secondary battery. This secondary battery has a construction, wherein an electrode winding body 3 on which a lead 1 of a cathode and a lead 2 of an anode are attached is housed inside film exterior members 4A and 4B. A size, a weight, and a thickness of this secondary battery can be reduced.

The leads 1 and 2 are directed from inside to outside of the exterior members 4A and 4B, and, for example, are derived in the same direction. The leads 1 and 2 are respectively made of a metal material such as aluminum, copper, nickel, and stainless, and are respectively in the shape of a thin plate or in the shape of a net.

The exterior members 4A and 4B are made of an aluminum laminated film in the shape of a rectangle, wherein, for example, a nylon film, an aluminum foil, and a polyethylene film are bonded together in this order. The exterior members 4A and 4B are, for example, arranged so that their polyethylene film sides and the electrode winding body 3 are faced, and respective outer edge parts are fusion-bonded or adhered to each other. Adhesive films 5 to protect from outside air intrusion are inserted between the exterior member 4A and the lead 1, and the exterior member 4A and the lead 2, and the exterior member 4B and the lead 1, and the exterior member 4B and the lead 2. The adhesive film 5 is made of a material having contact characteristics in relation to the leads 1 and 2. For example, the adhesive film 5 is made of a polyolefin resin such as polyethylene, polypropylene, modified polyethylene, and modified polypropylene.

The exterior members 4A and 4B can be made of a laminated film having other structure, a high molecular weight film such as polypropylene, or a metal film, instead of the foregoing aluminum laminated film.

Figure 6:
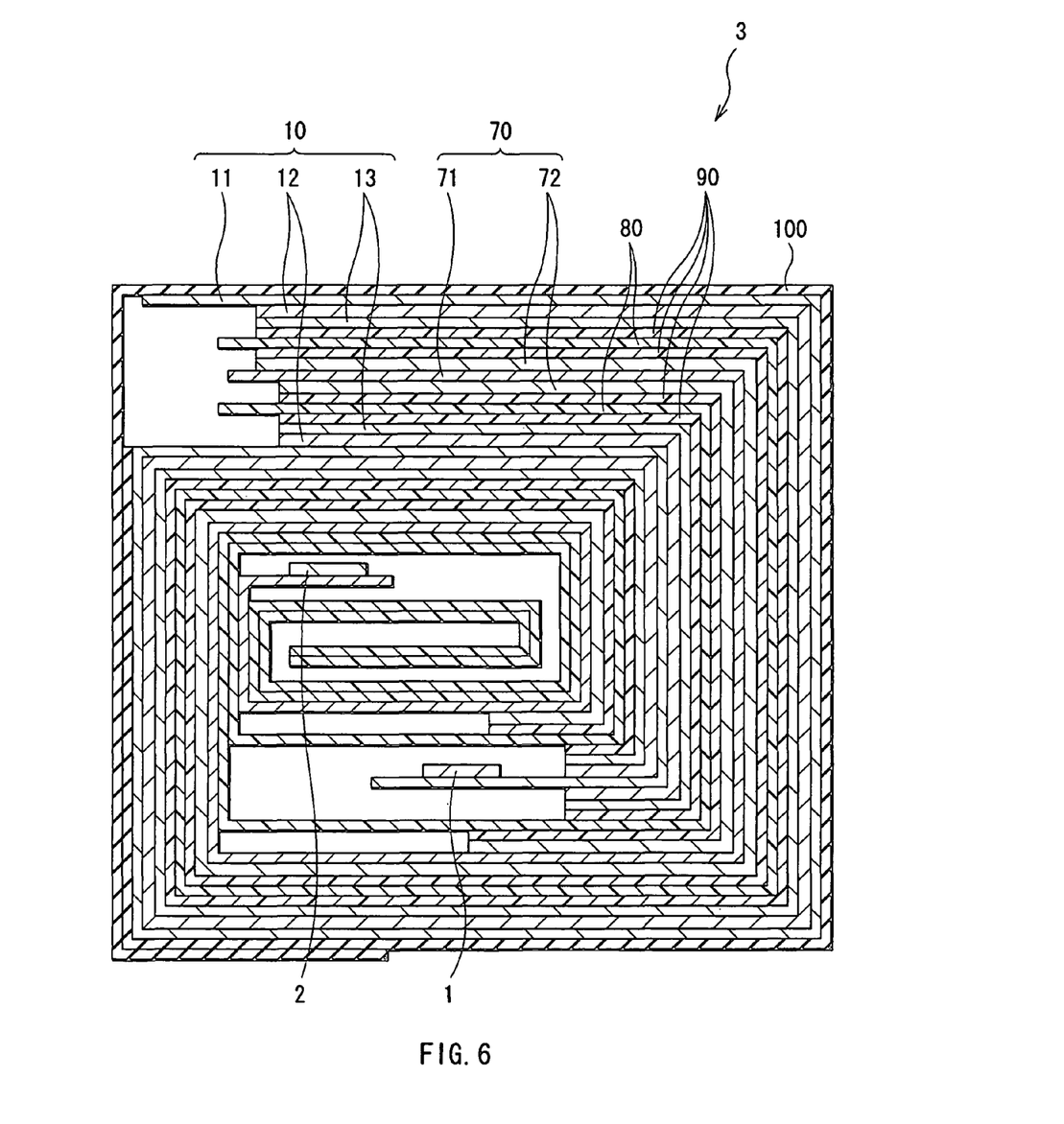
FIG. 6 is a cross sectional view, showing a construction taken along line VI-VI of an electrode winding body illustrated in FIG. 5.

FIG. 6 is a view showing a cross sectional structure taken along line VI-VI of the electrode winding body 3 illustrated in FIG. 5. The electrode winding body 3 is formed by layering and winding the electrode 10 as the anode and an electrode 70 as the cathode with a separator 80 and electrolyte layer 90 in between. An outermost peripheral part of the electrode winding body 3 is protected by a protective tape 100.

The electrode 10 comprises, for example, the active material layer 12 provided on single side or on both sides of the current collector 11. The electrode 70 also comprises an active material layer 72 provided on single side or on both sides of a current collector 71. It is arranged so that the active material layer 72 side is facing the thin film layer 13. Constructions of the current collector 71, the active material layer 72 and the separator 80 are similar to those of the foregoing current collector 41, the active material layer 42 and the separator 50.

The electrolyte layer 90 is made of a so-called gelatinous electrolyte, wherein an electrolytic solution is held by a holding body. The gelatinous electrolyte is preferable since high ion conductivity can be obtained, and battery leakage and swollenness due to high temperatures can be prevented. A construction of the electrolytic solution (that is, a solvent and an electrolyte salt) is similar to that of the coin type secondary battery shown in FIG. 4.

The holding body is made of, for example, a high molecular weight material. Examples of the high molecular weight material include polyvinylidene fluoride, which is a block copolymer.

This secondary battery can be manufactured as follows, for example.

First, the electrolyte layer 90, wherein an electrolytic solution is held in a holding body is formed on the electrode 10 and the electrode 70, respectively. Then, the lead 1 is attached to an end of the current collector 11 by welding or the like, and the lead 2 is attached to an end of the current collector 71 by welding or the like.

Next, the electrode 10 and the electrode 70, wherein the electrolyte layer 90 is respectively formed are layered with the separator 80 in between to obtain a layered body. Then, this layered body is wound in its longitudinal direction. The protective tape 100 is adhered to the outermost peripheral part to form the electrode winding body 3.

Lastly, for example, the electrode winding body 3 is sandwiched between the exterior members 4A and 4B, and the electrode winding body 3 is enclosed by adhering outer edges of the exterior members 4A and 4B by thermal fusion bonding or the like. Then, the adhesive films 5 are inserted between the lead 1 and the exterior member 4A, and the lead 1 and the exterior member 4B and the lead 2 and the exterior member 4A, and the lead 2 and the exterior member 4B. The secondary battery shown in FIGS. 5 and 6 is thereby completed.

This secondary battery acts similar to the coin type secondary battery shown in FIG. 4.

As above, in this embodiment, the secondary battery comprises the current collector containing a metal element which does not form an intermetallic compound with lithium, more specifically, the secondary battery comprises the current collector containing at least one from the group consisting of copper, nickel, titanium, iron, and chromium. Therefore, there is no structural destruction of the current collector 11 according to formation of an intermetallic compound with lithium, and fall-off of the active material layer 12 from the current collector 11 associated expansion and shrinkage. Further, in this embodiment, the battery comprises the thin film layer 13 containing at least one of metal elements and metalloid elements which can form an solid solution with lithium and do not form an intermetallic compound, more specifically containing at least one of copper and nickel on the active material layer 12. Therefore, reaction between the active material layer 12 and the electrolyte can be inhibited, and structural destruction of the active material layer 12 according to its expansion and shrinkage can be inhibited by covering the active material layer 12 with the thin film layer 13. In result, cycle characteristics can be improved.

In particular, when the current collector 11 is alloyed with the active material layer 12, structural destruction of the active material layer 12 can be further inhibited. In addition, when the active material layer 12 is alloyed with the thin film layer 13, reaction between the active material layer 12 and the electrolyte can be further inhibited.

Further, when a thickness of the thin film layer 13 is 50 nm to 1,000 nm, reaction between the active material layer 12 and the electrolyte can be inhibited without deterioration of load characteristics.

Furthermore, when a gelatinous electrolyte is used as an electrolyte, high ion conductivity can be obtained, and battery leakage and swollenness due to high temperatures can be prevented.

EXAMPLES

Further, descriptions will be given in detail of concrete examples of the invention.

Examples 1-1 and 1-2

First, the active material layer 12 made of silicon having a thickness of 4 μm was formed on the current collector 11 made of a copper foil having a thickness of 20 μm by electron beam evaporation. Subsequently, the thin film layer 13 made of nickel or copper having a thickness of 200 μm was formed on the active material layer 12 by electron beam evaporation. The electrodes 10 of Examples 1-1 and 1-2 were thereby formed. Thicknesses of the active material layer 12 and the thin film layer 13 were verified by a SEM (Scanning Electron Microscope).

Next, by using the formed electrodes 10 of Examples 1-1 and 1-2, coin-type secondary batteries having a diameter of 20 mm and a thickness of 16 mm shown in FIG. 4 were fabricated. The electrode 40 was formed by mixing cobalt acid lithium ($LiCoO_2$) powders of an active material having an average particle diameter of 5 μm, carbon black of a conductive material, and polyvinylidene fluoride of a binder at a mass ratio of cobalt acid lithium: carbon black: polyvinylidene fluoride=92:3:5, inputting the mixture in N-methyl pyrrolidone of a carrier fluid to make a mixture slurry, applying the mixture slurry to the current collector 41 made of aluminum having a thickness of 30 μm, and drying and pressurizing the resultant to form the active material layer 42. An electrolytic solution wherein $LiPF_6$ as a lithium salt was dissolved at a concentration of 1.0 mol/$dm^3$ in a solvent in which ethylene carbonate and dimethyl carbonate were mixed at a mass ratio of 1:1 was used. As the separator 50, a polypropylene film was used.

Regarding the fabricated secondary batteries of Examples 1-1 and 1-2, charge and discharge tests were conducted at 25° C. to obtain capacity retention ratio at 50th cycle. In this regard, charge was performed firstly at a constant current density of 1 mA/cm$^2$ until a battery voltage reached 4.2 V, and then performed at a constant voltage of 4.2 V until a current density reached 0.02 mA/cm$^2$. Discharge was performed at a constant current density of 1 mA/cm$^2$ until a battery voltage reached 2.5 V. When charge was performed, anode utility factor at an initial charge based on charge and discharge capacities of the electrode 10 and the electrode 40 previously obtained by actual measurement and calculation was set to 90% in order not to precipitate metal lithium. A capacity retention ratio at 50th cycle was calculated as a ratio of a discharge capacity at 50th cycle in relation to an initial discharge capacity, that is, (Discharge capacity at 50th cycle)/(initial discharge capacity)×100. Obtained results are shown in Table 1.

ducted as in Example 1-1, and capacity retention ratios at 50th cycle were obtained as well. These results are also shown in Table 1.

As evidenced by Table 1, according to Examples 1-1 and 1-2, wherein the thin film layer 13 was formed, and the current collector 11 and the thin film layer 13 were made of copper or nickel which can make a solid solution with lithium and does not form an intermetallic material with lithium, higher capacity retention ratios were obtained, compared to Comparative example 1-1, wherein the current collector was made of copper and a thin film layer was not formed; Comparative example 1-2, wherein the current collector was made of copper and the thin film layer was made of aluminum which forms an intermetallic compound with lithium; Comparative examples 1-2 and 1-3, wherein the thin film layer was made of titanium which does not make a solid solution with lithium; Comparative example 1-4, wherein the current collector was made of aluminum and a thin film layer was not formed; and Comparative example 1-5, wherein the current collector and the thin film layer were made of aluminum. That is, it was found that when the current collector 11 containing

TABLE 1

| | | Active material layer | | Thin film layer | | | Capacity retention ratio (%) |
|---|---|---|---|---|---|---|---|
| | Current collector | Material | Forming method | Material | Thickness (nm) | Forming method | |
| Example 1-1 | Cu | Si | Electron beam evaporation | Ni | 200 | Electron beam evaporation | 86 |
| Example 1-2 | Cu | Si | Electron beam evaporation | Cu | 200 | Electron beam evaporation | 85 |
| Comparative example 1-1 | Cu | Si | Electron beam evaporation | — | 0 | — | 71 |
| Comparative example 1-2 | Cu | Si | Electron beam evaporation | Al | 200 | Electron beam evaporation | 69 |
| Comparative example 1-3 | Cu | Si | Electron beam evaporation | Ti | 200 | Electron beam evaporation | 62 |
| Comparative example 1-4 | Al | Si | Electron beam evaporation | — | 0 | Electron beam evaporation | 64 |
| Comparative example 1-5 | Al | Si | Electron beam evaporation | Al | 200 | Electron beam evaporation | 63 |

As Comparative example 1-1 in relation to Examples 1-1 and 1-2, an electrode as an anode was fabricated in a manner similar to in Examples 1-1 and 1-2, except that a thin film layer was not formed. As Comparative examples 1-2 and 1-3 in relation to Examples 1-1 and 1-2, electrodes as an anode were fabricated in a manner similar to in Examples 1-1 and 1-2, except that the thin film layer made of aluminum or titanium was formed. As Comparative examples 1-4 and 1-5 in relation to Examples 1-1 and 1-2, electrodes as an anode were fabricated in a manner similar to in Examples 1-1 and 1-2, except that an aluminum foil was used as a current collector. In Comparative example 1-4, a thin film layer was not formed. In Comparative example 1-5, a thin film layer made of aluminum was formed. Further, secondary batteries were fabricated by using the electrodes of Comparative examples 1-1 to 1-5 in a manner similar to in Examples 1-1 and 1-2. Regarding the secondary batteries of Comparative examples 1-1 to 1-5, charge and discharge tests were cona metal element which does not form an intermetallic compound with lithium was used, and the thin film layer 13 containing a metal element which can make a solid solution with lithium and does not form an intermetallic compound with lithium was formed on the active material layer 12, cycle characteristics could be improved.

Examples 2-1 to 2-4

The electrodes 10 were fabricated by forming the active material layer 12 by sintering method. Specifically, first, as the current collector 11, a copper foil or a titanium foil having a thickness of 20 μm was prepared. Next, a mixture slurry was prepared by adding N-methyl pyrrolidone into a mixture wherein silicon powders having an average particle diameter of 1 μm and polyvinylidene fluoride were mixed at a mass ratio of 9:1. This mixture slurry was applied to the current collector 11, heated, and N-methyl pyrrolidone was volatilized. Next, the resultant was pressurized, and heat-treated and sintered at 300° C. for 8 hours in the argon atmosphere to form the active material layer 12. After forming the active material layer 12, on the surface of the active material layer 12, the thin film layer 13 made of copper having a thickness of 200 μm was formed by electron beam evaporation, or the thin film layer 13 made of nickel having a thickness of 200 μm was formed by electron beam evaporation. The electrode 10 was thereby fabricated. A thickness of the thin film layer 13 was verified by a SEM.

The obtained electrodes 10 of Examples 2-1 to 2-4 were analyzed by an AES (Auger Electron Spectroscopy) and an EDX (Energy Dispersive X-Ray Spectroscope). In result, it was confirmed that in Example 2-1, there was a mixture layer of components of the active material layer 12 and the current collector 11 in the vicinity of the interface between the active material layer 12 and the current collector 11, and there was a mixture layer of components of the active material layer 12 and the thin film layer 13 in the vicinity of the interface between the active material layer 12 and the thin film layer 13. That is, it was confirmed that the current collector 11 and the thin film layer 13 were alloyed with the active material layer 12 at least on part of the interface between the current collector 11/the thin film layer 13 and the active material layer 12. Meanwhile, in Example 2-2, alloying was confirmed only at part of the interface between the current collector 11 and the active material layer 12. In Example 2-3, alloying was confirmed only at part of the interface between the active material layer 12 and the thin film layer 13. In Example 2-4, alloying was not confirmed at any interface between the active material layer 12 and the current collector 11/the thin film layer 13.

As Example 2 in relation to Examples 2-1 to 2-4, an electrode as an anode was formed in a manner similar to in Examples 2-3 and 2-4, except that a thin film layer was not formed. Further, secondary batteries were fabricated by using the electrodes of Examples 2-1 to 2-4 and Comparative example 2 in a manner similar to in Example 1-1. Regarding the secondary batteries of Examples 2-1 to 2-4 and Comparative example 2, charge and discharge tests were also conducted and capacity retention ratios at 50th cycle were obtained as in Example 1-1. The results are shown in Table 2.

than in Comparative example 2, wherein a thin film layer was not formed. That is, it was found that when the active material layer 12 was formed by sintering method, cycle characteristics could be improved, if the current collector 11 containing the metal element which does not form an intermetallic compound with lithium was used, and the thin film layer containing a metal element which can make a solid solution with lithium and does not form an intermetallic compound with lithium was formed on the active material layer 12.

As evidenced by Examples 2-1 to 2-4, the capacity retention ratio of Example 2-1, wherein both the current collector 11 and the thin film layer 13 were respectively made of copper which is alloyed with silicon was the highest. The capacity retention ratio of Example 2-4, wherein alloying could not be confirmed at any interface between the active material layer 12 and the current collector 11/the thin film layer 13 was the lowest. That is, it was found that in order to further improve the capacity retention ratio, the current collector 11 and the thin film layer 13 were preferably made of a metal material which does not form an intermetallic compound with lithium, and is alloyed with silicon.

Examples 3-1 to 3-6

As Examples 3-1 to 3-6 and Comparative example 3, the electrodes 10 were formed in a manner similar to in Example 1-1, except that the active material layer 12 made of germanium having a thickness of 4 μm was formed by electron beam evaporation, and thicknesses of the thin film layer 13 were changed as shown in Table 3. Thicknesses of the active material layer 12 and the thin film layer 13 were verified by a SEM.

Next, secondary batteries shown in FIGS. 5 and 6 were fabricated by using the fabricated electrodes 10 of Examples 3-1 to 3-6 and Comparative example 3. The electrode 70 was formed as in the electrode 40. The electrolyte layer 90 was formed by applying a precursor solution, wherein 10 wt % of polyvinylidene fluoride as a block copolymer having a weight-average molecular weight of 0.6 million and 60 wt % of dimethyl carbonate were mixed and dissolved in 30 wt % of electrolytic solution consisted of 42.5 wt % of ethylene

TABLE 2

| | | Active material layer | | Thin film layer | | | Capacity |
| | Current collector | Material | Forming method | Material | Thickness (nm) | Forming method | retention ratio (%) |
|---|---|---|---|---|---|---|---|
| Example 2-1 | Cu | Si | Sintering | Cu | 200 | Electron beam evaporation | 83 |
| Example 2-2 | Cu | Si | Sintering | Ni | 200 | Electron beam evaporation | 81 |
| Example 2-3 | Ti | Si | Sintering | Cu | 200 | Electron beam evaporation | 78 |
| Example 2-4 | Ti | Si | Sintering | Ni | 200 | Electron beam evaporation | 76 |
| Comparative example 2 | Ti | Si | Sintering | — | 0 | — | 66 |

As evidenced by Table 2, according to Examples 2-1 to 2-4, wherein the thin film layer 13 was formed, the current collector 11 and the thin film layer 13 were made of copper, nickel, or titanium, which does not form an intermetallic compound with lithium, higher capacity retention ratios were obtained carbonate, 42.5 wt % of propylene carbonate, and 15 wt % of LiPF$_6$ as a lithium salt to the electrode 10 and the electrode 70, respectively, keeping the resultant at ambient temperatures for 8 hours, and volatilizing dimethyl carbonate. Regarding the obtained secondary batteries of Examples 3-1 to 3-6 and Example 3, charge and discharge tests were also conducted and capacity retention ratios at 50th cycle were obtained as in Example 1-1. The results are shown in table 3.

TABLE 3

| | Current collector | Active material layer | | Thin film layer | | | Capacity retention ratio (%) |
|---|---|---|---|---|---|---|---|
| | | Material | Forming method | Material | Thickness (nm) | Forming method | |
| Example 3-1 | Cu | Ge | Electron beam evaporation | Ni | 10 | Electron beam evaporation | 72 |
| Example 3-2 | Cu | Ge | Electron beam evaporation | Ni | 50 | Electron beam evaporation | 81 |
| Example 3-3 | Cu | Ge | Electron beam evaporation | Ni | 300 | Electron beam evaporation | 84 |
| Example 3-4 | Cu | Ge | Electron beam evaporation | Ni | 600 | Electron beam evaporation | 86 |
| Example 3-5 | Cu | Ge | Electron beam evaporation | Ni | 1,000 | Electron beam evaporation | 78 |
| Example 3-6 | Cu | Ge | Electron beam evaporation | Ni | 1,500 | Electron beam evaporation | 73 |
| Comparative example 3 | Cu | Ge | Electron beam evaporation | — | 0 | — | 69 |

As evidenced by Table 3, according to Examples 3-1 to 3-6, wherein the thin film layer 13 was formed, higher capacity retention ratio was obtained than in Comparative example 3, wherein a thin film layer was not formed. As evidenced by Examples 3-1 to 3-6, a capacity retention ratio became high as a thickness of the thin film layer 13 was increased, reached a maximum value, and then became lowered. That is, it was found that when the active material layer 12 was made of germanium, cycle characteristics could be improved, if the thin film layer 13 was formed, and the current collector 11 and the thin film layer 13 were made of a metal material which does not form an intermetallic compound with lithium. It was also found that higher effects could be obtained, if a thickness of the thin film layer 13 was 50 nm to 1,000 nm.

Example 4

The electrode 10 was formed in a manner similar to in Example 3-3, except that the active material layer 12 was formed by coating. The active material layer 12 was formed by preparing a mixture slurry by adding N-methyl pyrrolidone into a mixture of germanium having an average particle diameter of 1 μm, graphitized vapor-phase growth carbon fiber, and polyvinylidene fluoride at a mass ratio of 85:5:10, applying this mixture slurry to the current collector 11, and then heating the resultant to volatilize N-methyl pyrrolidone, and pressurizing the resultant. As Comparative example 4 in relation to Example 4, an electrode as an anode was formed in a manner similar to in Example 4, except that a thin film layer was not formed. The secondary batteries were fabricated in a manner similar to in Example 3-3 by using the formed electrodes 10 of Example 4 and Comparative example 4. Further, regarding the obtained secondary batteries of Example 4 and Comparative example 4, charge and discharge tests were also conducted and capacity retention ratios at 50th cycle were obtained as in Example 1-1. The results are shown in Table 4 with the results of Example 3-3 and Comparative example 3.

TABLE 4

| | Current collector | Active material layer | | Thin film layer | | | Capacity retention ratio (%) |
|---|---|---|---|---|---|---|---|
| | | Material | Forming method | Material | Thickness (nm) | Forming method | |
| Example 3-3 | Cu | Ge | Electron beam evaporation | Ni | 200 | Electron beam evaporation | 84 |
| Example 4 | Cu | Ge | Coating | Ni | 200 | Electron beam evaporation | 36 |
| Comparative example 3 | Cu | Ge | Electron beam evaporation | — | 0 | — | 69 |
| Comparative example 4 | Cu | Ge | Coating | — | 0 | — | 33 |

As evidenced by Table 4, in Example 4, wherein the active material layer 12 was formed by coating, a higher capacity retention ratio than in corresponding Comparative example 4 was obtained as in Example 3-3, wherein the active material layer 12 was formed by vapor-phase deposition method. That is, it was found that when the active material layer 12 was formed by coating, cycle characteristics could be improved, if the current collector 11 containing a metal element which does not form an intermetallic compound with lithium was used, and the thin film layer containing a metal element which can make a solid solution with lithium and does not form an intermetallic compound with lithium is formed on the active material layer 12.

In the foregoing Examples, the current collector 11 contained copper or titanium, and the thin film layer 13 contained nickel or copper. However, similar results can be obtained when other element which does not form an intermetallic compound with lithium is contained. Further, similar results can be also obtained, when the active material layer 12 is formed by vapor-phase deposition method, other sintering method, or liquid-phase deposition method, instead of electron beam evaporation. Furthermore, similar results can be also obtained when the thin film layer 13 is formed by vapor-phase deposition method, sintering method, or liquid-phase deposition method, instead of electron beam evaporation.

While the invention has been described with reference to the embodiment and Examples, the invention is not limited to the foregoing embodiment and Examples, and various modifications may be made. For example, though in the foregoing embodiment and Examples, the case using the high molecular weight material as a holding body has been described. However, an inorganic conductor such as lithium nitride and lithium phosphate, and mixture of a high molecular weight material and an inorganic conductor can be used as a holding body.

Further, in the foregoing embodiment and Examples, the electrode 10, wherein the active material layer 12 is provided on the current collector 11 has been described. However, other layer can be provided between a current collector and an active material layer. In addition, other layer can be provided between an active material layer and a thin film layer.

Further, in the foregoing embodiment and Examples, the secondary batteries in the shape of a coin or a winding laminated body have been described. However, the invention can be applied to secondary batteries such as a cylinder type, a square type, a button type, a thin type, a large type, and a layered laminated type secondary batteries. Further, this invention can be applied not only to secondary batteries, but also to primary batteries.

As described above, according to the electrode of the invention or according to the battery of the invention, a current collector containing at least one from the group consisting of copper, nickel, titanium, iron, and chromium; or a current collector containing a metal element which does not form an intermetallic compound with lithium is provided. Therefore, there is no structural destruction of the current collector according to formation of an intermetallic compound with lithium, and fall-off of the active material layer from the current collector due to expansion and shrinkage can be inhibited. Further, according to the electrode of the invention or according to the battery of the invention, a thin film layer containing at least one of copper and nickel, or a thin film layer containing at least one of metal elements and metalloid elements which can make a solid solution with lithium and do not form an intermetallic compound with lithium is provided on the active material layer. Therefore, reaction between the active material layer and the electrolyte can be inhibited, and structural destruction of the active material layer according to its expansion and shrinkage can be inhibited by covering the active material layer with the thin film layer. In result, cycle characteristics can be improved.

In particular, according to the electrode of one aspect of the invention, or according to the battery of one aspect of the invention, the current collector is alloyed with the active material layer at least on part of the interface thereof Therefore, structural destruction of the active material layer can be further inhibited.

Further, according to the electrode of another aspect of the invention, or according to the battery of another aspect of the invention, the active material layer is alloyed with the thin film layer at least on part of the interface thereof. Therefore, reaction between the active material layer and the electrolyte can be further inhibited.

Furthermore, according to the electrode of still another aspect of the invention, or according to the battery of still another aspect of the invention, a thickness of the thin film layer is 50 nm to 1,000 nm. Therefore, reaction between the active material layer and the electrolyte can be inhibited without deterioration of load characteristics.

In addition, according to the battery of still another aspect of the invention, the holding body, the solvent, and the electrolyte salt were contained. Therefore, high ion conductivity can be obtained, and battery leakage or swollenness due to high temperatures can be prevented.

Obviously many modifications and variations of the present invention are possible in the light of the above teachings. It is therefore to be understood that within the scope of the appended claims the invention may be practiced otherwise than as specifically described.

What is claimed is:

1. An electrode comprising:
   a current collector containing at least one from the group consisting of copper (Cu), nickel (Ni), titanium (Ti), iron (Fe), and chromium (Cr);
   an active material layer on said current collector containing at least one of silicon (Si), germanium (Ge) and compounds thereof; and
   a thin film layer on a portion of a surface of the active material layer containing at least one of copper and nickel provided on the active material layer,
   wherein,
   the active material layer and thin film layer are on either or both sides of the current collector,
   at an interface between at least one of said active material layers and said current collector they are alloyed together, and
   the thin film layer comprises several layers and the layer in contact with the active material layer is made of a metal material which alloys with silicon or germanium and the other layers are made of one or more metal materials different than that of the layer in contact with the active material layer.

2. An electrode comprising:
   a current collector containing a metal element which does not form an intermetallic compound with lithium (Li);
   an active material layer on said current collector containing at least one of silicon (Si), germanium (Ge) and compounds thereof; and
   a thin film layer on a portion of a surface of the active material layer containing at least one of metal elements and metalloid elements which can make a solid solution with lithium and do not form an intermetallic compound with lithium provided on the active material layer, wherein,
the active material layer and thin film layer are on either or both sides of the current collector,
at an interface between at least one of said active material layers and said current collector they are alloyed together, and
the thin film layer comprises several layers and the layer in contact with the active material layer is made of a metal material which alloys with silicon or germanium and the other layers are made of one or more metal materials different than that of the layer in contact with the active material layer.

3. An electrode according to claim 2, wherein the current collector contains a metal element which does not form an intermetallic compound with lithium, and is alloyed with at least one of silicon, germanium and compounds thereof.

4. An electrode according to claim 2, wherein the thin film layer contains at least one of metal elements and metalloid elements which can make a solid solution with lithium and do not form an intermetallic compound with lithium, and are alloyed with at least one of silicon, germanium and compounds thereof.

5. An electrode according to claim 2, wherein at said interface, material from at least one of said active material layer and said current collector is diffused into the other.

6. An electrode according to claim 2, wherein the active material layer is alloyed with the thin film layer at least on part of the interface thereof.

7. An electrode according to claim 2, wherein the active material layer is formed by at least one method of from the group consisting of vapor-phase deposition method, liquid-phase deposition method, and sintering method.

8. An electrode according to claim 2, wherein the thin film layer is formed by at least one method of from the group consisting of vapor-phase deposition method, liquid-phase deposition method, and sintering method.

9. An electrode according to claim 2, wherein the current collector contains at least one from the group consisting of copper (Cu), nickel (Ni), titanium (Ti), iron (Fe), and chromium (Cr).

10. An electrode according to claim 2, wherein the thin film layer contains at least one of copper (Cu) and nickel (Ni).

11. an electrode according to claim 2, wherein a thickness of the thin film layer is from 50 nm to 1,000 nm.

12. A battery comprising:
an electrolyte;
a cathode; and
an anode; having
(a) a current collector containing at least one from the group consisting of copper (Cu), nickel (Ni), titanium (Ti), iron (Fe), and chromium (Cr);
(b) an active material layer on said current conductor containing at least one of silicon (Si), germanium (Ge) and compounds thereof; and
(c) a thin film layer on a portion of a surface of active material layer containing at least one of copper and nickel provided on the active material layer,
wherein,
the active material layer and thin film layer are on either or both sides of the current collector,
at an interface between said active material layer and said current collector they are alloyed together, and
the thin film layer comprises several layers and the layer in contact with the active material layer is made of a metal material which alloys with silicon or germanium and the other layers are made of one or more metal materials different than that of the layer in contact with the active material layer.

13. A battery comprising:
a cathode;
an anode; and
an electrolyte,
wherein, said anode comprises
(a) a current collector containing a metal element which does not form an intermetallic compound with lithium (Li),
(b) an active material layer on said current collector containing at least one of silicon (Si), germanium (Ge) and compounds thereof, and
(c) a thin film layer on a portion of a surface of active material layer containing at least one of metal elements and metalloid elements which can make a solid solution with lithium and do not form an intermetallic compound with lithium provided on the active material layer,
wherein,
the active material layer and thin film layer are on either or both sides of the current collector,
at an interface between said active material layer and said current collector they are alloyed together, and
the thin film layer comprises several layers and the layer in contact with the active material layer is made of a metal material which alloys with silicon or germanium and the other layers are made of one or more metal materials different than that of the layer in contact with the active material layer.

14. A battery according to claim 13, wherein the current collector contains a metal element which does not form an intermetallic compound with lithium, and is alloyed with at least one of silicon, germanium and compounds thereof.

15. A battery according to claim 13, wherein the thin film layer contains at least one of metal elements and metalloid elements which can make a solid solution with lithium and do not form an intermetallic compound with lithium, and are alloyed with at least one of silicon, germanium and compounds thereof.

16. An electrode according to claim 13, wherein at said interface, material from at least one of said active material layer and said current collector is diffused into the other.

17. A battery according to claim 13, wherein the active material layer is alloyed with the thin film layer at least on part of the interface thereof.

18. A battery according to claim 13, wherein the active material layer is formed by at least one method from the group consisting of vapor-phase deposition method, liquid-phase deposition method, and sintering method.

19. A battery according to claim 13, wherein the thin film layer is formed by at least one method from the group consisting of vapor-phase deposition method, liquid-phase deposition method, and sintering method.

20. A battery according to claim 13, wherein the current collector contains at least one from the group consisting of copper (Cu), nickel (Ni), titanium (Ti), iron (Fe), and chromium (Cr).

21. A battery according to claim 13, wherein the thin film layer contains at least one of copper (Cu) and nickel (Ni).

22. A battery according to claim 13, wherein a thickness of the film layer is from 50 nm to 1,000 nm.

23. A battery according to claim 13, wherein the electrolyte contains a holding body, a solvent, and an electrolyte salt.

24. A battery according to claim 13, wherein film exterior members housing the cathode, the anode, and the electrolyte are further provided.

25. A battery according to claim 13, wherein the cathode contains a lithium-containing metal complex oxide.

26. An electrode according to claim 1, wherein at said interface, material from at least one of said active material layer and said current collector is diffused into the other.

27. An electrode according to claim 12, wherein at said interface, material from at least one of said active material layer and said current collector is diffused into the other.

* * * * *